July 21, 1959 H. FREMONT ET AL 2,896,070

RADIO AND TELEVISION SURVEY SYSTEM

Filed July 2, 1956 2 Sheets-Sheet 1

HERBERT FREMONT,
HAROLD N. PARKER,
INVENTORS.

BY Flam and Flam

ATTORNEYS.

RADIO AND TELEVISION SURVEY SYSTEM

Filed July 2, 1956 2 Sheets-Sheet 2

HERBERT FREMONT,
HAROLD N. PARKER,
INVENTORS.
BY Flam and Flam
ATTORNEYS.

United States Patent Office 2,896,070

Patented July 21, 1959

2,896,070

RADIO AND TELEVISION SURVEY SYSTEM

Herbert Fremont, Los Angeles, and Harold N. Parker, Van Nuys, Calif., assignors to Calbest Engineering & Electronics Co., Los Angeles, Calif., a corporation of California Application July 2, 1956, Serial No. 595,251

13 Claims. (Cl. 250—2)

Figure 1:
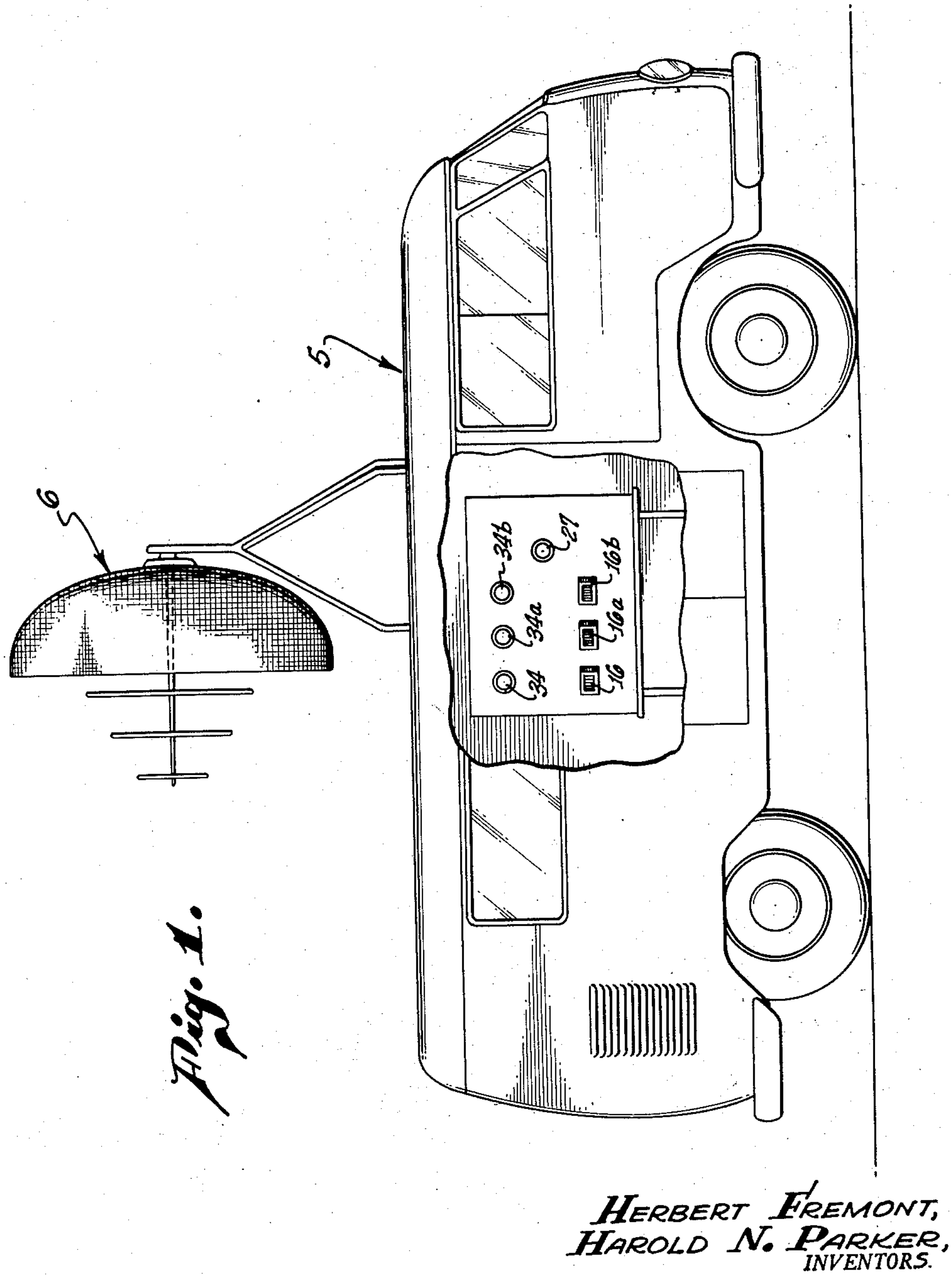

This invention relates to apparatus for surveying stations or channels being received on home radio or television receivers.

Survey systems heretofore in use required the conscious cooperation of the consumer. The telephone method is one of these. There is no essential incentive for consumers truthfully to give the information required. Often they may report programs to which they would like to be listening or simply give any answer merely to terminate what might be considered an annoying interference with the privacy of the home.

One method of correcting this is to install mechanisms on a number of receivers. This requires the original consent of the consumer; but he is not thereafter annoyed, and the mechanism would eliminate the element of cooperation of the consumer.

To be of any real value, a great number of installations must be made; otherwise, the sampling is too limited. Obviously the last factor becomes prohibitive.

It has been suggested that the foregoing disadvantages might be overcome by utilizing a mobile receiver adapted to detect the radiations from the local oscillators of the radio equipment. Thus, the particular setting of the variable oscillator in the superheterodyne receiver radiates detectible energy that can serve as a means of conducting a statistical survey without the conscious cooperation or permission of the consumer.

Systems of this character have been proposed. Heretofore, accuracy has been a limiting factor. Extraneous signals, such as due to an FM receiver, may falsely indicate a TV station; and there may be difficulty in discriminating between operation of one or a plurality of receivers where a common antenna is used, as in a multiple unit dwelling. Other possibilities of error are present.

The primary object of this invention is to provide mobile apparatus adapted accurately to conduct statistical surveys of this character by detecting radiations from the local oscillators of receivers.

Another object of this invention is to provide a device for this purpose in which the chances of a sporadic or haphazard signal in the apparatus itself has but little chance of affecting the count and in which preset compensating means are provided to eliminate from the count extraneous signals originating outside of the detecting apparatus.

Another object of this invention is to provide a device of this character utilizing counters so that the results are directly available without requiring evaluation, interpretation, or the like.

Still another object of this invention is to provide apparatus of this character in which a statistical survey may be accurately conducted very quickly.

Although the present invention may not attain complete accuracy, the percentage of error as compared with known systems is very greatly reduced.

This invention possesses many other advantages, and has other objects which may be made more clearly apparent from a consideration of one embodiment of the invention. For this purpose, there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Figure 2:
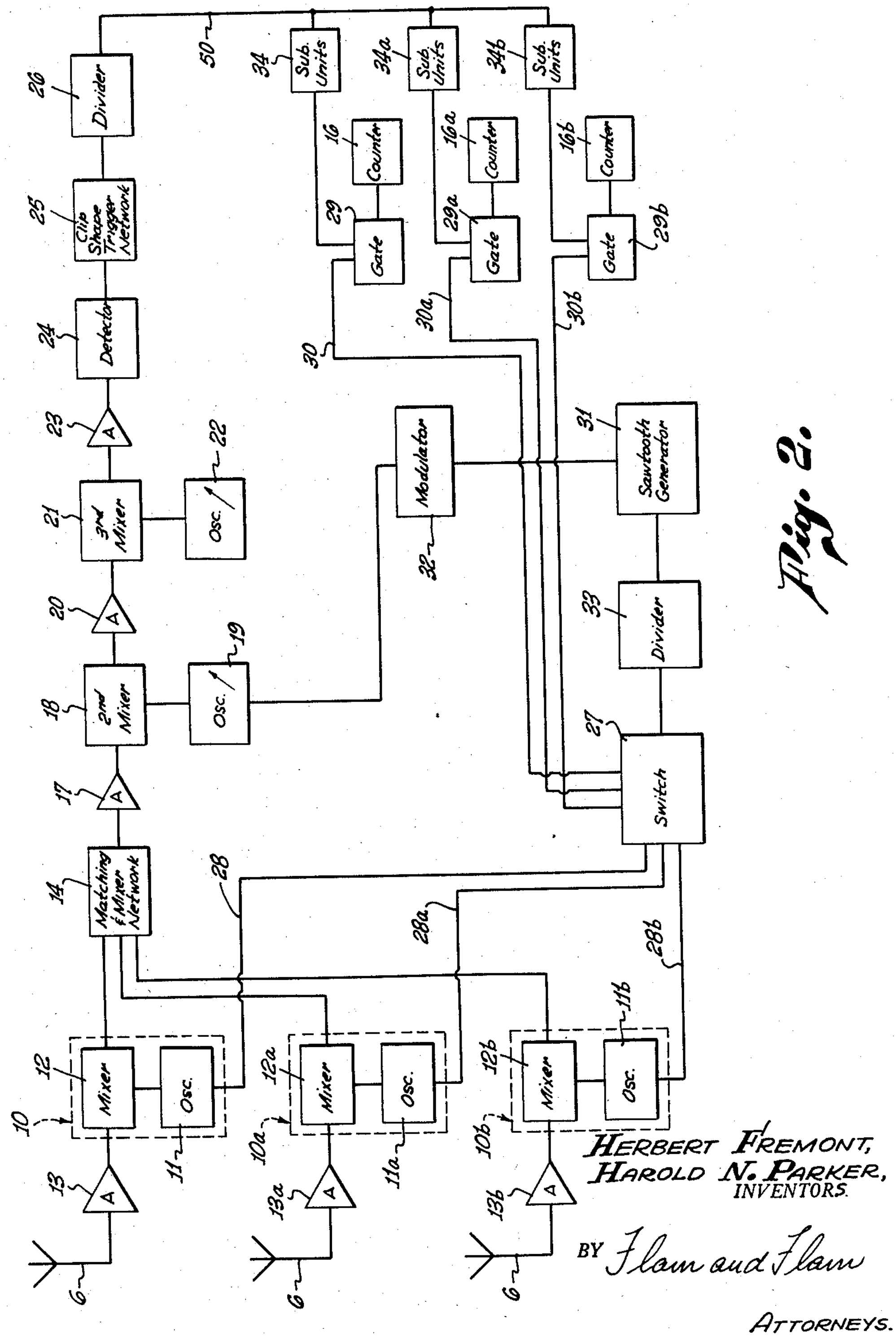

Referring to the drawings:

Figure 1 illustrates mobile equipment in connection with which apparatus incorporating the present invention is used; and Fig. 2 is a block diagram illustrating the elements of the system.

Substantially all radio and television receivers in present day use use the superheterodyne circuit in which the radio frequency is changed or heterodyned to a first intermediate frequency. Radio circuits are designed about a particular first intermediate frequency so that proper amplification results only when the first intermediate frequency falls within a narrow frequency band. The first intermediate frequency depends upon the difference in frequencies of the fixed carrier wave and that of a variable local oscillator. Tuning is accomplished by adjusting the local oscillator until the desired intermediate frequency is obtained.

The local oscillator in the receiver radiates energy that is strong enough to be detected by a sensitive receiver. The energy from the local oscillator may be radiated by the antenna used principally for receiving purposes. The frequency of the local oscillator necessary to effect tuning depends upon the frequency of the carrier wave. Accordingly, if the frequency of the local oscillator is known, the frequency of the radio frequency carrier wave and the corresponding station or channel is also known.

In the drawing, there is illustrated the elements of a sensitive receiver for detecting the energy radiated by local oscillators of radio or television sets. The mobile apparatus 5 (Fig. 1) rotatably mounts a suitable parabolic or other antenna structure 6 so that the antenna structure can be directed to a television antenna or to the general vicinity of a radio.

The antenna 6 may include separate sections each having lengths appropriate for reception of the signals under consideration. If particular efficiency is required, as many sections may be provided as there are permissible frequency settings of local oscillators germane to the survey. However, some antenna sections may be used for receiving several frequencies within a certain band.

When a television receiver, for example, is tuned to a carrier frequency of 60 megacycles and the receiver operates at a first intermediate frequency of 40 mcs., the local oscillator of the receiver is set at 100 mcs. The local oscillator of the receiver radiates energy at this frequency that is picked up by the antenna 6. The signals at 100 mcs. are heterodyned by a heterodyne set 10 to a first intermediate frequency of the sensitive receiver apparatus.

A television receiver, tuned, for example, for a carrier frequency of 70 mcs., has its local oscillator operating at 110 mcs. to produce the desired intermediate frequency of 40 mcs. of the television receiver. Signals at 110 mcs. are picked up by the antenna 6 and are heterodyned by a second heterodyne set 10*a* to the intermediate frequency of the sensitive receiver structure.

Another television receiver, for example tuned to a carrier wave of 80 mcs., has its local oscillator set at 120 mcs. A third heterodyne set 10*b* heterodynes the signals to the first intermediate frequency of the sensitive receiver structure.

As many heterodyne sets may be provided as there are frequencies germane to the survey. Only three are shown in the present instance, but it is understood that this may be representative of a larger number.

The heterodyne set 10 includes a fixed oscillator 11 and a mixer 12. If it is desired that the first intermediate frequency of the sensitive receiver structure be 40 mcs., then the local oscillator 11 must have a frequency of 140 mcs. properly to cooperate with the signal at 100 mcs. Similar mixers **12*a* and 12*b* and oscillators 11*a* and 11*b* form parts of the other heterodyne sets 10 and 10*b*. The oscillators 11*a* and 11*b* for the example given are set at 150 and 160 mcs. respectively to produce the desired intermediate frequency. Radio frequency amplifiers 13, 13*a* and 13*b* are interposed between the antenna 6 and the mixers 12, 12*a* and 12*b***.

The outputs from all the mixers 12, **12*a* and 12*b* are fed through a matching and mixing network 14 which prevents interaction between the heterodyne sets. The signals are converted to a low frequency and finally to a pulse form for appropriate operation of mechanical or electrical counters 16, 16*a* and 16*b*. The signal converting apparatus includes a first intermediate frequency amplifier 17 fed by the network 14, which amplifier feeds a second mixer 18 cooperating with a local oscillator 19**.

Various radio or television receiving sets may operate on slightly different intermediate frequencies. Furthermore, the tuning of the oscillators may vary somewhat. Thus, for example, in connection with the heterodyne set 10, the signals received may deviate one or two mcs. from the assumed 100 mcs. The signals at the intermediate frequency accordingly may range one or two mcs. away from 40 mcs. Thus, the first intermediate frequency amplifier 17 must pass a band of frequencies on opposite sides of 40 mcs.

In order not to lose any signals and yet achieve a common final low frequency output at the end of the receiver, a scanning system is provided. The amplifier 20 from the output of the second mixer 18 is tuned sharply to a second intermediate frequency of the apparatus, for example, 10 mcs. To pass all of the signals to the amplifier 20 despite a frequency deviation of one or two mcs., the frequency output of oscillator 19 is variable. The oscillator 19 may sweep through a frequency range of 48½ to 51½ mcs., for example, in order that the signal appears at the amplifier 20 at the second intermediate frequency to which it is tuned. Thus, for example, if the intermediate frequency of a signal feeding the second mixer 18 is 41 mcs., this will produce a signal in the tuned amplifier 20 when the oscillator has a frequency setting at or about 51 mcs. The second intermediate frequency amplifier 20 provides an intermittent output at the second intermediate frequency recurring periodically according to the cyclic adjustment of the oscillator 19. The phase relationship between the cyclic oscillator and the intermittent signal is immaterial so far as the counting system is concerned. Actually it serves an important function to be described hereinafter.

The amplifier 20 feeds a third mixer 21 cooperating with a fixed local oscillator 22 producing a third or low frequency output. The low frequency amplifier 23 feeds a detector 24. The detected signals operate a trigger network 25 that reduces the intermittent signals to sharp pulses of uniform amplitude for appropriate operation of the pulse counters.

In order to differentiate between the pulses originating from the respective heterodyne sets 10, **10*a*, 10*b*, a switching device 27 is provided. The switching device operates the oscillators 11, 11*a* and 11*b* separately and in any desired sequence. The switch is operable to pass through all its switching positions automatically and then stop. Also, the switch may be set to a definite position. Lines 28, 28*a* and 28*b* from the switching device 27 indicate controls of the respective local oscillators 11, 11*a* and 11*b* by the switch 27**.

The switching device 27 also correspondingly controls the operation of the counters 16, **16*a* and 16*b* so that energy received by the respective heterodyne sets 10, 10*a* and 10*b* is effective to energize the corresponding counters 16, 16*a* and 16*b*. For this purpose, gates or electronic valves 29, 29*a* and 29*b*, respectively controlling counters 16, 16*a* and 16*b*, are provided. They are controlled by the switching device 27 so that only the counter 16, for example, is operative when the oscillator 11** is operative.

All of the gates or electronic valves 29, **29*a* and 29*b* connect with the output connection 50 from the detecting device through subtracting units 34, 34*a* and 34*b* to be hereinafter described. Lines 30, 30*a* and 30*b*, respectively leading from the switching device 27, indicate control of the gates or electronic valves 29, 29*a* and 29*b* by the switching device 27**.

The scanning or sweep oscillator 19 for reducing the signals to intermittent form passes through a definite number of cycles for each switching position of the switching device 27 so that the counters 16, **16*a* and 16*b* give intelligible results. For this purpose, a low frequency sawtooth generator 31, which may operate at 16 cycles per second, for example, synchronizes the operation of the switching device 27 and the local oscillator 19**. Both are controlled thereby.

A reactance modulator 32, controlled by the sawtooth generator 31, is provided for causing the oscillator 19 to pass cyclically through its frequency range.

A novel method is employed in the detection apparatus to achieve a high degree of accuracy. Spurious and random electrical noise impulses, which are detected and amplified, are prevented from adding to the count by a system of multiplication and division. For this purpose, the scanning oscillator 19 is caused to pass through more than one cycle for every switching position of the switching device 27. This is achieved by a signal divider 33 interposed between the sawtooth generator 31 and the switching device 27 and also by a signal divider 26 interposed between the output from the pulse producing network and the counters. For example, the signal divider 33 causes the switching device 27 to move to its next switching position only after four cycles of the sawtooth generator 31 corresponding to four cycles of the variable oscillator 19. Accordingly, four pulses appear at the output of the detector 24 for every switching position of the switching device 27 should energy be transmitted by the corresponding heterodyne set.

A spurious signal may increase the number of pulses from four to five or six. The signal divider 27 divides the number of pulses at its input by a number corresponding to that of the signal divider 33 and rejects remainders. Thus, should five or six pulses appear at the output of the detector 26, the signal divider 25 divides by four, answering one, and rejecting the odd one or two pulses remaining. As long as a multiple of four spurious impulses do not appear, an accurate count accordingly is assured by the multiplying and dividing process.

It was found that random impulses rarely appear during each cycle of the variable oscillator 19. Accordingly, a factor of four is adequate to achieve exceptional accuracy. However, for even greater accuracy, the factor may be increased.

Spurious signals external the apparatus may be detected by the antenna 6. For example, a carrier wave of an FM or television station may be near 100 megacycles, which is the frequency of the local oscillator set to heterodyne a carrier frequency of a station under consideration. Other signals external the apparatus may also be present. To compensate for this, subtraction units 34, **34*a* and 34*b* are provided for cooperation with the respective counters 16, 16*a* and 16*b* to rectify the count. The subtraction units 34, 34*a* and 34*b* may be adjusted manually to subtract any number of units from the pulses fed thereto through the respective gates or valves 29, 29$a$ and 29$b$. The setting of the subtraction units 34, 34$a$ and 34**$b$ may be fixed according to previously derived information from the characteristics of the surroundings in which the survey is conducted.

The antenna is directed toward a television antenna, or the like, or to the general vicinity of a radio receiver in a home or apartment. The switching device 27 is then caused to pass through one cycle of operation and the counters 16, 16$a$ and 16$b$ are operated only upon the transmission of signals by the respective heterodyne sets, the subtraction units 34, 34$a$, 34$b$ eliminating spurious signals from the count. The mobile apparatus then moves to the next station and the process is repeated.

A less accurate relative count may also be obtained by causing the switching device 27 to operate continuously while the mobile apparatus proceeds. The accuracy in this case may depend upon the velocity of the mobile apparatus relative to the cycling speed of the switching device 27 and the uniformity of distribution of antennas in the vicinity. A valuable relative count may, nevertheless, be thus obtained in certain localities.

Where a plurality of television antennas, for example, are mounted upon a common mast, as is the practice in many apartments and multiple dwellings, it would seem that the apparatus would provide only one pulse even though a plurality of receivers were operative on the same channel. In practice, however, it is quite unlikely that local oscillators of even identical television receivers be set closer than 100 kilocycles apart, since a deviation of 100 kilocycles in the frequency of the local oscillators is not significant in fine tuning of the receivers. Thus, if two television receivers are tuned to the same channel and are operated by antennas on a common mast, the local oscillators of the respective sets will radiate energy at detectibly different frequencies. The scanning oscillator 19 introduces a phase difference between such signals, and they appear either as time separated intermittent outputs or as a double peaked combined intermittent output. In either case, the trigger circuits and detector are sufficiently sensitive to produce two pulses. By making the apparatus sensitive to a 50-kilocycle variation in frequency, the counters 16, 16$a$ and 16$b$ being sufficiently responsive, a substantially true count is obtained. The 50-kilocycle sensitivity is, of course, achieved by appropriate design of the detection apparatus.

Naturally the system described herein is appropriate for all frequencies. The specific examples given are understood merely to aid explanation.

The inventors claim:

1. In a polling system responsive to the radiations from local oscillators utilized by radio receiving sets: successively operable means responsive to various pre-set frequencies to produce out-of-phase impulses; means repeating the impulses through a number of cycles at each position of the successively operable means; means dividing the cumulative impulses by said number; and successively operable means synchronously operated with the impulse producing means for integrating the impulses from the dividing means.

2. In a polling system responsive to the radiations from local oscillators utilized by radio receiving sets: successively operable means responsive to various pre-set frequencies to produce out-of-phase impulses; means repeating the impulses through a number of cycles at each position of the successively operable means; means dividing the cumulative impulses by said number and rejecting remainders; and successively operable means synchronously operated with the impulse producing means for integrating the impulses from the dividing means.

3. In a survey system for remotely detecting the energy radiated by variable local oscillators of receiving sets: a plurality of receiving means respectively tuned to different frequencies and each adapted to transmit electrical impulses at approximately a predetermined intermediate frequency; circuit means fed by the output of the receiving means for converting the impulses into pulses; a plurality of counters actuated by the circuit means; and a switch for simultaneously conditioning any one of the receiving means and a corresponding counter.

4. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically operable circuit means fed by the output of the receiving means for converting the impulses into pulses; a plurality of counters actuated by the circuit means; a switch for operating the receiving means in succession; and means operated by the switch for conditioning the counters in corresponding succession.

5. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically operable circuit means fed by the output of the receiving means for converting the impulses into pulses; a switch for selecting one of the receiving means; means for causing the circuit means to operate through a predetermined number of cycles when the switching means is at one position; means for dividing the pulses produced by said circuit means by said number; a plurality of counters operated by said dividing means; and means operated by the switch for conditioning the counters in accordance with the operation of the receiving means.

6. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically operable circuit means fed by the output of the receiving means for converting the impulses into pulses; a switch for operating the receiving means in succession; means for causing the circuit means to operate through a predetermined number of cycles when the switching means is at one position; means for dividing the pulses produced by said circuit means by said number and rejecting the remainder for every switching position; a plurality of counters operated by said dividing means; and means operated by the switch for conditioning the counters for operation in corresponding succession.

7. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically operable circuit means fed by the output of the receiving means for converting the impulses into pulses; a plurality of counters operated by said impulse producing means; a switch for conditioning the receiving means and the counters in corresponding succession; and adjustable means for each counter for subtracting a predetermined number of impulses for each switching position of said receiving means.

8. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically operable circuit means fed by the output of the receiving means for converting the impulses into pulses; a switch for operating the receiving means in succession; means for causing the circuit means to operate through a predetermined number of cycles when the switching means is at one position; means for dividing the pulses produced by said circuit means by said number and rejecting the remainder for each switching position; a plurality of counters operated by said dividing means; means operated by the switch for conditioning the counters in corresponding succession; and adjustable means for each counter for subtracting a predetermined number of impulses for each switching position of said receiving means.

9. In a survey system for remotely detecting the energy radiated by variable local oscillators of receiving sets: a plurality of receiving means respectively tuned to different frequencies and each adapted to transmit electrical impulses at approximately a predetermined intermediate frequency; cyclically tuned circuit means fed by the output of the receiving means for converting the impulses into pulses; said circuit means being sufficiently sensitive to provide distinct pulses for impulses, the frequencies of which differ by substantially fifty kilocycles; a plurality of counters actuated by the circuit means; and a switch for simultaneously conditioning any one of the receiving means and a corresponding counter.

10. In a survey system for remotely detecting the energy radiated by the variable local oscillators of receiving sets: antenna means; a mixer circuit and a local oscillator for each frequency under consideration and fed by antenna means for producing signals at substantially a first intermediate frequency; a second mixer fed by the signals; a periodically variable oscillator for operating the second mixer; a low frequency wave generator; means controlled by the generator for cyclically varying the frequency of the variable oscillator; first means fed by the generator for dividing the generator impulses by a predetermined number; a switch controlled by the output of the dividing means for operating the local oscillators in succession; the dividing means and the generator causing the variable oscillator to pass through said number of cycles for each switching position of said switch; sharply tuned circuit means cooperating with said second mixer for converting the signal output from the mixer to an intermittent signal at another intermediate frequency; means for converting the intermittent signals into sharp pulses; means for dividing the pulses by said predetermined number; a plurality of counters fed by the pulse dividing means; and means controlled by the switch for conditioning the counters in succession in accordance with the position of the switch.

11. In a survey system for remotely detecting the energy radiated by variable local oscillators of receiving sets: antenna means; a mixer circuit and a local oscillator for each frequency under consideration and fed by antenna means for producing signals at substantially a first intermediate frequency; a second mixer fed by the signals; a periodically variable oscillator for operating the second mixer; a low frequency wave generator; means controlled by the generator for cyclically varying the frequency of the variable oscillator; first means fed by the generator for dividing the generator impulses by a predetermined number; a switch controlled by the output of the dividing means for operating the local oscillators in succession; the dividing means and the generator causing the variable oscillator to pass through said number of cycles for each switching position of said switch; sharply tuned circuit means cooperating with said second mixer for converting the signal output from the mixer to an intermittent signal at another intermediate frequency; means for converting the intermittent signals into sharp pulses; means for dividing the pulses by said predetermined number; a plurality of counters fed by the pulse dividing means; and means controlled by the switch for conditioning the counters in succession in accordance with the position of the switch; the switch automatically becoming inoperative after completing a cycle of switching positions.

12. In a survey system for remotely detecting the energy radiated by variable local oscillators of receiving sets: antenna means; a mixer circuit and a local oscillator for each frequency under consideration and fed by antenna means for producing signals at substantially a first intermediate frequency; a second mixer fed by the signals; a periodically variable oscillator for operating the second mixer; a low frequency wave generator; means controlled by the generator for cyclically varying the frequency of the variable oscillator; first means fed by the generator for dividing the generator impulses by a predetermined number; a switch controlled by the output of the dividing means for operating the local oscillators in succession; the dividing means and the generator causing the variable oscillator to pass through said number of cycles for each switching position of said switch; sharply tuned circuit means cooperating with said second mixer for converting the signal output from the mixer to an intermittent signal at another intermediate frequency; means for converting the intermittent signals into sharp pulses; means for dividing the pulses by said predetermined number; a plurality of counters fed by the pulse dividing means; means controlled by the switch for conditioning the counters in succession in accordance with the position of the switch; and adjustable subtraction apparatus for each counter for subtracting a number of pulses for each switching position of the switch.

13. In a survey system for remotely detecting the energy radiated by local oscillators of receiving sets: a plurality of receiver means respectively tuned to different frequencies corresponding to stations under survey, said receiver means each providing, upon the existence of said frequencies, output at a common intermediate frequency band, the band width corresponding to the deviation of settings of receiving set local oscillators tuned to the same carrier wave; switch means for operating the receiver means in sequence; means fed by the output of the receiver means and receptive to all frequencies within said band for resolving the frequencies within said band to a time-spaced series of pulses corresponding to the different frequencies, said resolving means being operable through a predetermined number of cycles for each switching position of said switch; a plurality of counters corresponding to the stations under survey and actuated by said pulses; and synchronizing means for conditioning the counters for operation simultaneously with the corresponding receiving means.

References Cited in the file of this patent

UNITED STATES PATENTS 2,552,585 Rahmel ---------------- May 15, 1951